(12) United States Patent
Burns et al.

(10) Patent No.: US 6,345,301 B1
(45) Date of Patent: Feb. 5, 2002

(54) SPLIT DATA PATH DISTRIBUTED NETWORK PROTOCOL

(75) Inventors: David A. Burns, Aston; Benjamin L. Dagana, Phoenixville; Christopher J. Harrer, Downingtown; Dung M. Luu, Philadelphia; Todd A. Matters; Michael S. Miles, both of Pottstown; Barry E. Blust, Glenmoore; Thomas J. Schneider, Exton; Thomas V. Connors, Audubon, all of PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/281,549

(22) Filed: Mar. 30, 1999

(51) Int. Cl.[7] .............................................. G06F 15/163
(52) U.S. Cl. ........................ 709/230; 709/223; 710/131
(58) Field of Search ................................. 709/230, 223; 710/131

(56) References Cited

U.S. PATENT DOCUMENTS

| 5,261,059 A | 11/1993 | Hedberg et al. ............ 710/132 |
| 5,313,584 A | 5/1994 | Tickner et al. ................ 710/37 |
| 5,481,707 A | 1/1996 | Murphy, Jr. et al. ......... 709/102 |
| 5,517,668 A | 5/1996 | Szwerinski et al. .......... 709/230 |
| 5,764,922 A | 6/1998 | Peacock et al. ................. 710/6 |
| 5,826,027 A | * 10/1998 | Pedersen et al. ............. 709/221 |
| 6,122,670 A | * 9/2000 | Bennett et al. .............. 709/236 |
| 6,226,680 B1 | * 5/2001 | Boucher et al. ............. 709/230 |
| 6,273,622 B1 | * 8/2001 | Ben-David ................... 709/230 |

OTHER PUBLICATIONS

Internet site: http://www.i2osig.org/Architecture/TechBack98.html pp 1–6, Feb. 1999.
Internet site: http://www.i2osig.org/Architecture/QandA98.html pp. 1–3, Feb. 1999.

* cited by examiner

*Primary Examiner*—Kenneth R. Coulter
(74) *Attorney, Agent, or Firm*—Mark T. Starr

(57) ABSTRACT

A network node that implements a distributed TCP/IP network communication protocol stack, with the protocol stack including a TCP layer and an IP layer. The TCP layer includes a TCP management unit and a TCP data path unit, and the IP layer includes an IP management unit and an IP data path unit. The network node comprises a network host configured with the TCP management unit and the IP management unit, and at least one I/O adapter coupled to the network host and configured with the TCP data path unit and the IP data path unit. In this manner, the TCP data path unit and the IP data path unit are distributed onto the I/O adapter.

20 Claims, 19 Drawing Sheets

SPLIT DATA PATH DISTRIBUTED NETWORK PROTOCOL

BACKGROUND

Most contemporary computer networks use the TCP/IP (Transmission Control Protocol/Internet Protocol) communications protocol. This protocol serves as the backbone of the Internet, and is the primary communications protocol for most computer systems today. Specifically, TCP/IP is a multi-layer protocol based on the ISO/OSI model. This model begins at the lowest level with a physical layer, and builds-on successively the data link layer, the network layer, the transport layer, the session layer, the presentation layer, and the application layer.

The physical layer concerns itself with the low-level details of transmitting bits over a physical medium. The data link layer takes the raw physical medium from the physical layer, and presents this medium to the network layer as an error-free medium. Thus, the data link layer handles any noise problems or other transmission errors affecting the raw physical medium, and shields the data link layer from the details of handling those problems. The data link layer also builds the bits transmitted by the physical layer into logical structures called frames or packets. The network layer receives the frames from the data link layer, and handles the issues that arise when routing the frames from source to destination, or from network to network. The transport layer on a source network node receives these frames from the network layer on that node and ensures that all of these frames are received correctly at the destination node. The session layer, presentation layer, and the application layer handle higher level details that are not germane to this application. For further details on the various layers of the ISO/OSI model, see Andrew S. Tanenbaum, Computer Networks, Second Edition, Prentice Hall (1988), section 1.4, which is hereby incorporated by reference in its entirety.

The transport layer in the ISO/OSI model discussed above assumed a perfectly functioning network layer. That is, the transport layer on a source node simply sent messages down to its network layer and assumed that those messages would be sent correctly to the destination. However, as network complexity grew and network reliability decreased, this assumption became too naïve, and the function of the transport layer had to be redesigned. This redesign of the network layer led to the development of the Transport Control Protocol (TCP). Unlike the transport layer of the ISO/OSI model, TCP does not assume a perfect network layer, and can handle and compensate for an unreliable underlying network layer.

The network layer in the ISO/OSI model has evolved into an implementation as the Internet Protocol (IP). IP operates on 64 k-byte datagrams, and transmits them throughout the Internet without regard to the reliability of the underlying network. As discussed above, network reliability issues are handled by TCP in the transport layer. Most modern networks use the transport protocol TCP in conjunction with the network protocol IP; hence the acronym TCP/IP.

As clearly appreciated from the above discussion, implementation of the TCP/IP protocol imposes significant overhead onto the processor of a network node. The processor resources devoted to supporting TCP/IP are not available to other applications running on the node that compete for those resources. Thus, the processor spends more time swapping between tasks, thereby degrading overall server throughput. Further, the bandwidth, or data-carrying capacity, of modem network channels is rapidly increasing.

For example, it is not uncommon now for the server to be the bottleneck in the network, rather than the network channel. However, if more of the TCP/IP overhead can be off-loaded from the processor, the server may cease to be the network bottleneck, the performance of the server may approach the bandwidth of the network channel, and the server may improve its overall throughput. Accordingly, there is a need in the art for a protocol that minimizes the TCP/IP overhead imposed on the processor, thereby freeing the processor to devote more resources to other applications.

SUMMARY OF THE DISCLOSURE

A network node is provided that implements a distributed TCP/IP network communication protocol stack, with the protocol stack including a TCP layer and an IP layer. The TCP layer includes a TCP management unit and a TCP data path unit, and the IP layer includes an IP management unit and an IP data path unit. The network node comprises a network host configured with the TCP management unit and the IP management unit, and at least one I/O adapter coupled to the network host and configured with the TCP data path unit and the IP data path unit, thereby distributing the TCP data path unit and the IP data path unit onto the I/O adapter.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. It is understood, however, that the invention is not limited to the specific methods and instrumentalities disclosed or illustrated. In the drawings.

DETAILED DESCRIPTION OF THE PREFERRED EMBODIMENT

Figure 1:
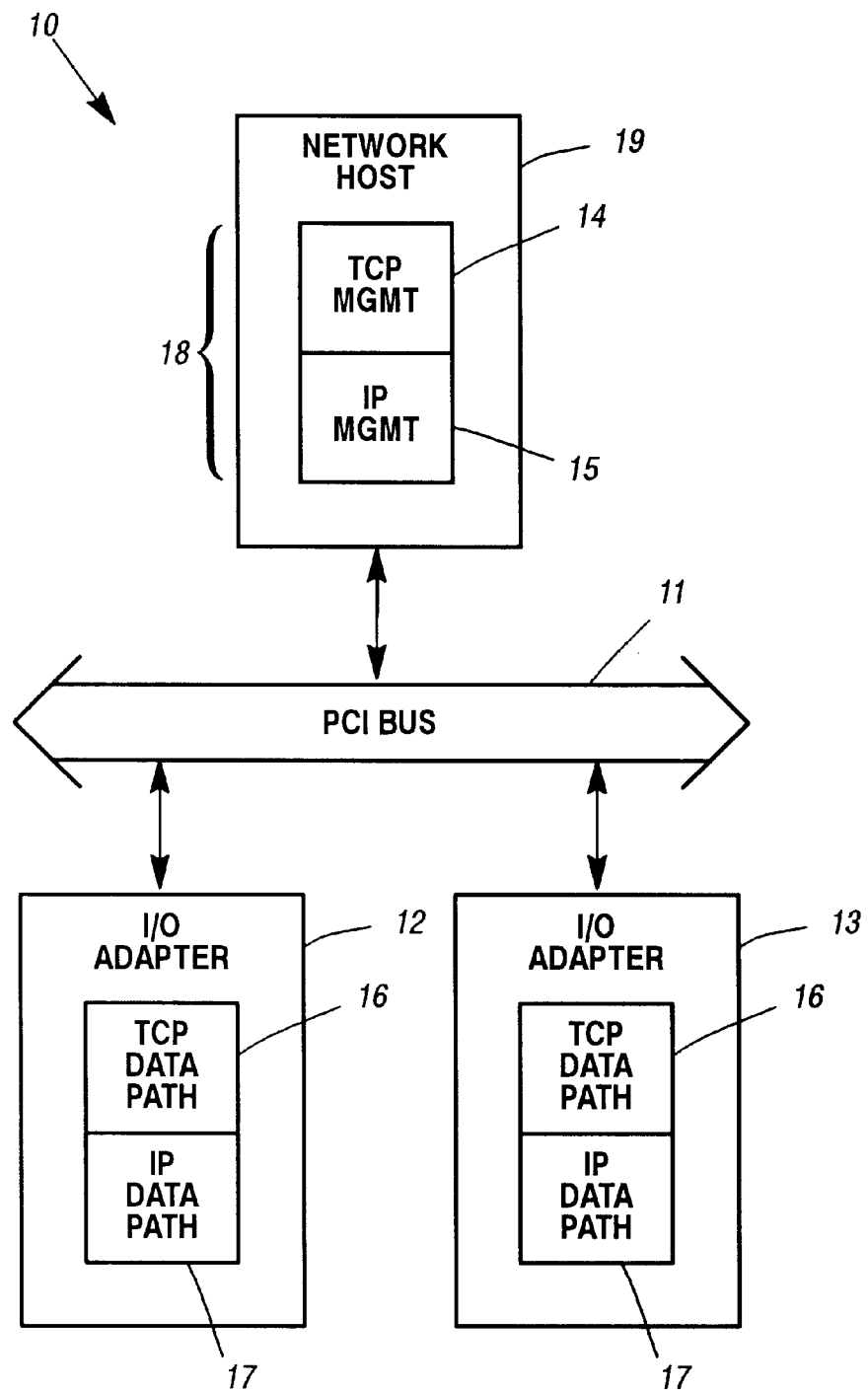
FIG. 1 is a diagram of an exemplary embodiment of a network node implementing a distributed TCP/IP network communication protocol stack.

Referring to the drawings, wherein like numerals represent like elements throughout, FIG. 1 is a diagram of an exemplary embodiment of a network node 10 implementing a distributed TCP/IP network communication protocol stack 18. The protocol stack 18 includes a TCP layer and an IP layer, with the TCP layer including a TCP management unit 14 and a TCP data path unit 16, and the IP layer including an IP management unit 15 and an IP data path unit 17. In the exemplary embodiment shown in FIG. 1, the network node 10 includes a network host 19 configured with the TCP management unit 14 and the IP management unit 15, and at least one I/O adapter 12. The I/O adapter 12 is coupled to the network host 19 and is configured with the TCP data path unit 16 and the IP data path unit 17, thereby distributing the TCP data path unit 16 and the IP data path unit 17 onto the I/O adapter 12.

In further embodiments of the invention, at least a second I/O adapter 13 can be coupled to the network host 19, with the second I/O adapter 13 providing a second TCP data path unit 16 and a second IP data path unit 17. The second I/O adapter 13 is structurally identical to the first I/O adapter 12. In this manner, the network host 19 can access the network over two paths, with one path provided by the first I/O adapter 12 and a second path provided by the second I/O adapter 13. The network host 19 can access these dual paths simultaneously; for example, the network host 19 can utilize the first adapter 12 for file transfer applications, and utilize the second adapter 13 for database transactions. It should be noted that although FIG. 1 illustrates a strictly exemplary embodiment having two I/O adapters 12 and 13, the invention could readily be practiced with one I/O adapter 12, or more than two I/O adapters 12 and 13.

The exemplary network node 10 shown in FIG. 1 offers significant advantages over past approaches to optimizing the performance of TCP/IP stacks. In the past, network designers have proposed offloading certain functions, such as checksum calculation, from the network host onto peripheral network interface cards (NIC), and while this first approach yields modest performance improvement, such limited offloading has not greatly increased stack performance.

As a second approach, network designers have also proposed offloading the entire IP layer to the NIC, and leaving the TCP layer resident on the network host. Once again, this second approach improves stack performance somewhat, but many low-level functions remain resident on the network host, where they can bog down the network host with low-level processing demands. This second approach can be conceptualized as a "horizontal" split. Referring to FIG. 1, if the network host were configured with the entire TCP layer, including the TCP management unit and the TCP data path unit, and if the I/O adapter were configured with the entire IP layer, including the IP management unit and the IP data path unit, then the TCP/IP stack is said to split "horizontally." In contrast, the invention splits the TCP/IP in a manner opposite to the second approach, or in other words "vertically."

Unlike past approaches to optimizing TCP/IP stacks, the invention offloads the data path units 16 and 17 of both the TCP layer and the IP layer onto the I/O adapter 12. With the low level processing offloaded onto the I/O adapter 12, the network host 19 is free to devote all of its resources to handling high level functions. Thus, the I/O adapter 12 is configured to handle interrupts and other processing overhead associated with the TCP data path unit 16 and the IP data path unit 17 independently from the network host 19.

Offloading the TCP and IP data path units 16 and 17 presents several problems that must be overcome. First, sequence numbers, as per the TCP header used to manage the TCP sliding window, can present a problem in the context of a vertical split. For a TCP connection, the starting sequence numbers are determined by management code. As data is transferred, the sequence numbers are incremented. With a vertical split, as proposed by this invention, the data is transferred in the I/O adapter 12 and the network host 19 does no data path processing. Thus, the network host 19 does not know the current sequence number. Yet, when the connection is to be terminated, the connection disestablishment, or termination, logic in the network host 19 must know what the sequence numbers are in order to effect the termination protocol, but because of the vertical split, the network host 19 doesn't know what the new sequence numbers are. The SDP ISM remembers the sequence numbers at connection establishment time and maintains fields at connection disestablishment time. So to the host TCP management component, it appears that no data was sent. This is detailed in the FIG. 16 below, which illustrates in part a Normal Connection Termination. Second, handling acknowledgement signals can also present a problem in the context of a vertical split. Typically, network protocols define acknowledgement signals (ACK) that allow network entities to confirm that their data transfers over the network are successful and complete. In the context of a non-split TCP/IP stack, or a "horizontally" split stack, an application running on the network host 19 initiates a data transfer over the network, and awaits acknowledgement signals from the network host 19 to indicate that the transfer is complete and successful. TCP level acknowledgements from remote nodes typically occur about every 3000 bytes of data (two TCP packets). Hence, many acknowledgements are necessary for large data transfers. Because the network host 19 handles the data path functions in a non-split or horizontally split environment, it receives and handles numerous acknowledgement signals for a typical application send, and returns a single acknowledgement signal back to the application. When the application receives this acknowledgement signal, it knows that it can purge its buffers if necessary for the next data transfer.

However, in the proposed split data path protocol, the data path units 16 and 17 are offloaded to the I/O adapter 12, rather than residing on the network host 19. Accordingly, the I/O adapter 12 now handles the acknowledgement signals, but the I/O adapter 12 is now separated from the network host 19. Thus, the application on the network host 19 may not know when and if its data transfer has been acknowledged, and thus may not know when it can purge and reclaim its buffers. This is accomplished in two ways. One way is through the "Optimized Reply" capability, which is illustrated below in FIG. 14. The second way is that the SDP OSM copies the application buffer into one of its own. In the first case, the acknowledgement is delayed; in the second case, the acknowledgment is immediate. The form of communication to the application is Operating System specific.

Third, managing whether the network data resides in memory on the host or on the adapter is a problem. In contemporary TCP/IP networks, larger TCP window sizes are used to optimize throughput, but these larger TCP window sizes create large amounts of data awaiting acknowledgements from the remote node. Typically, the memory storage capacity of the network host 19 is relatively large compared to the storage capacity of the I/O or network adapter 12. Given current memory densities, it is impractical for the I/O adapter 12 to store all of this data pending acknowledgment from the remote node. Accordingly, this data resides in the larger memory of the network host 19, but is managed logically in the I/O adapter 12. The SDP ISM maintains "tag" structures that point to host memory. The SDP ISM management of the "tags" allows the SDP ISM to not be concerned with the physical location of memory.

Fourth, the state of a TCP connection must be coordinated between the host management component and the data path component.

In the exemplary embodiment shown in FIG. 1, a bus 11 couples the network host 19 to the I/O adapter 12, with the PCI bus being a suitable bus architecture for implementing the bus 11. It should be understood, however, that bus architectures other than PCI may be suitable for coupling the network host 19 to the I/O adapter 12, and that the invention is not limited to the PCI bus.

Figure 2:
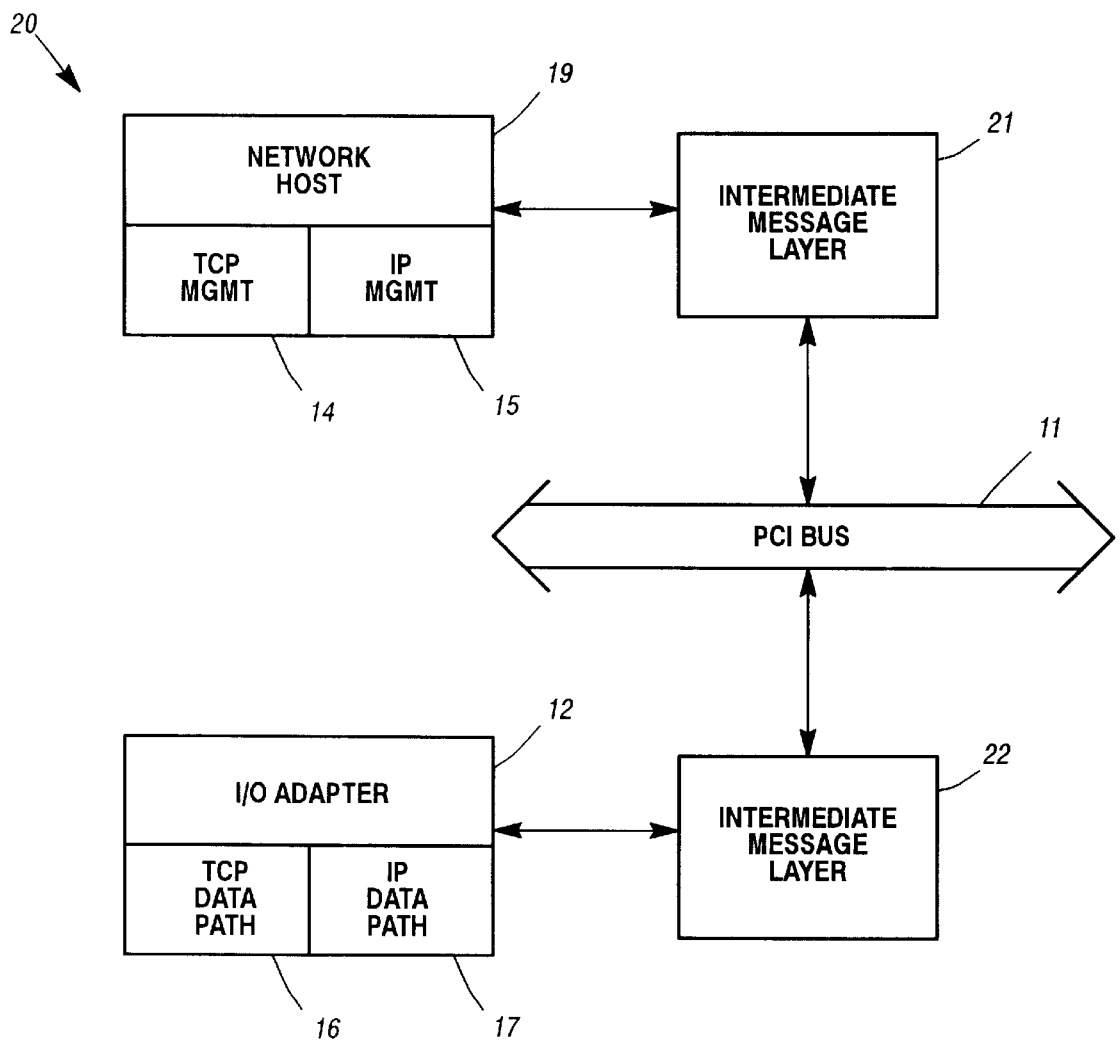
FIG. 2 is a diagram of a further exemplary embodiment of the invention.

FIG. 2 is a diagram of a further exemplary embodiment 20 of the invention employing intermediate message layers 21 and 22 disposed between the network host 19 and the I/O adapter 12. These intermediate message layers 21 and 22 provides a device-independent link between the network host and the I/O adapter 12. In this manner, the details involved in implementing the device drivers necessary to communicate with the I/O adapter 12 are hidden from the operating system residing on the network host 19. A suitable architecture for implementing the intermediate message layers 21 and 22 is the 120 specification promulgated by the 120 Special Interest Group (www.i2osig.org) at 404 Balboa Street; San Francisco, Calif. 94118. Specific information on implementing systems conforming to the 120 specification is readily available, and is not provided here. It should be further noted that the FIG. 2 shows an exemplary, and not limiting, embodiment of the invention, and that the invention can readily be practiced without using the intermediate message layer.

Figure 3:
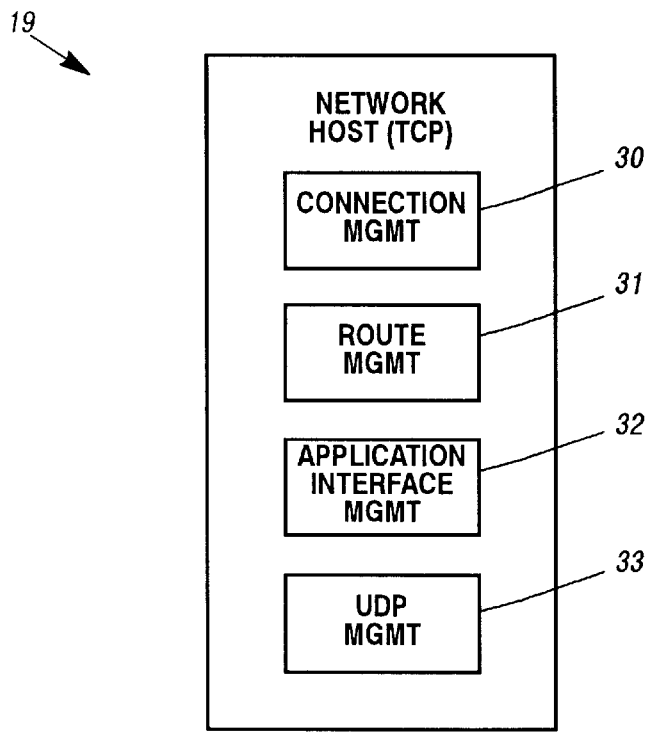
FIG. 3 is a diagram of the functions residing on the network node shown in FIG. 1.

Having described the broad layout of the split data path protocol and how the data path and management functions are distributed between the network host 19 and the I/O adapter 12, the specific TCP and IP functions residing on the network host 19 and the I/O adapter 12 will now be defined. FIG. 3 is a diagram of the functions residing on the network node 19 shown in FIG. 1. In an exemplary embodiment of the invention, the network host 19 can be configured to perform at least one of the following TCP management functions. The network host can manage TCP connections between the network host and the network, including establishing and de-establishing a connection between the network host and the network, managing the routes (block 30) used to transfer data between the network host and the network (block 31), managing the interface between an application running on the network host and the network (block 32), and UDP (Universal Datagram Protocol) management (block 33).

UDP is a connectionless transport protocol that essentially provides a user interface to IP, and is layered over IP. UDP and other services may exist over the IP layer. UDP contains a management unit and a data path unit. The network host may perform UDP management; however, if the network host does UDP management, then it also does UDP data path.

Figure 4:
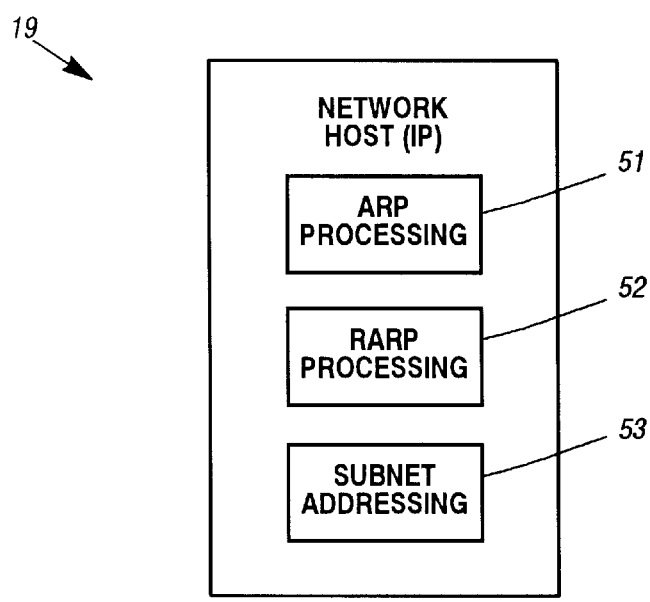
FIG. 4 is a diagram of exemplary IP management functions residing on the network host shown in FIG. 1.

FIG. 4 is a diagram of exemplary IP management functions residing on the network host shown in FIG. 1. As shown in FIG. 4, the network host includes means 51 for implementing an address resolution protocol (ARP), means 52 for implementing a reverse address resolution protocol (RARP), and means 53 for performing subnet addressing.

Figure 5:
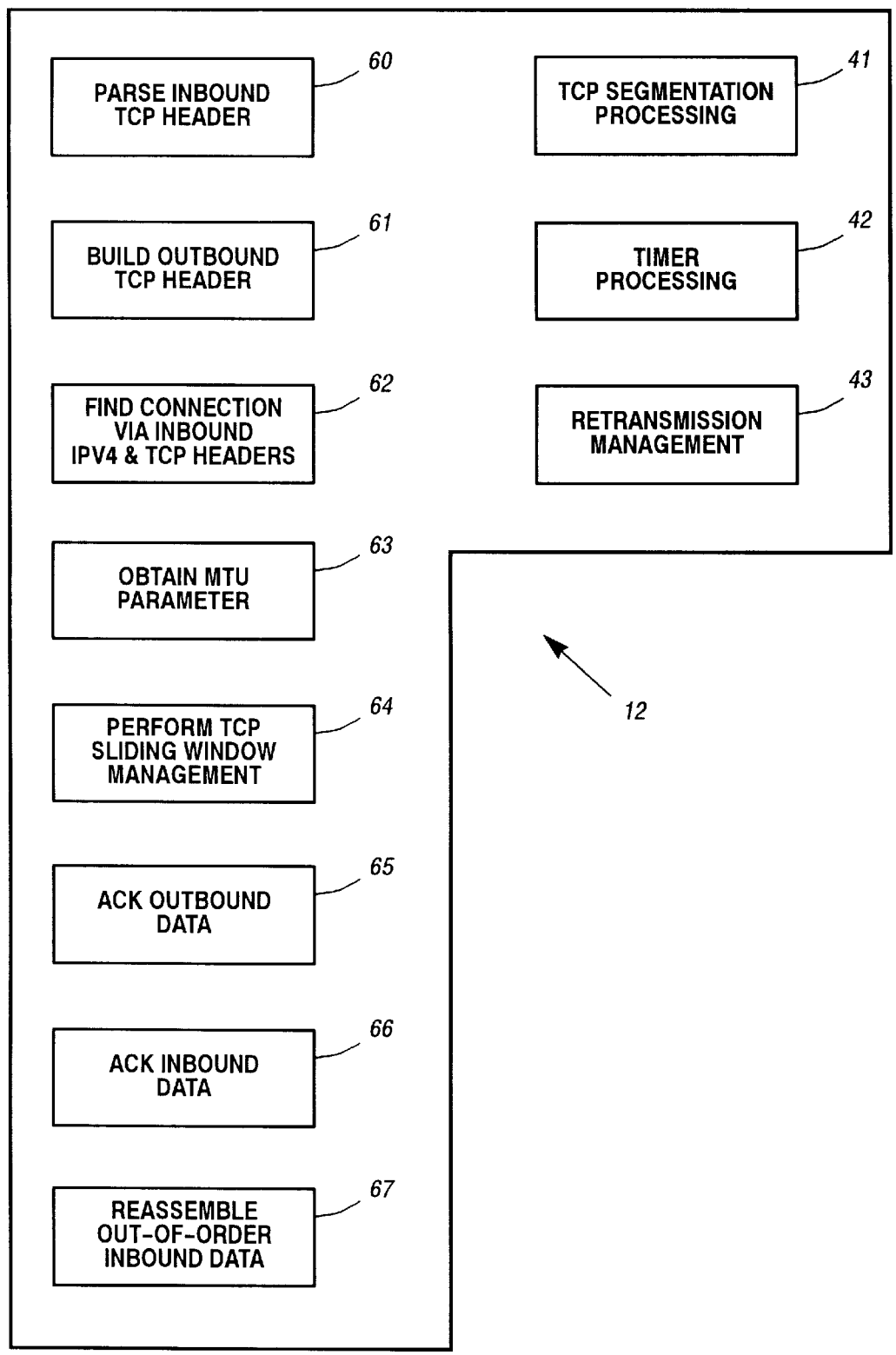
FIG. 5 is a diagram of exemplary TCP data path functions off-loaded onto the I/O adapter shown in FIG. 1.

FIG. 5 is a diagram of exemplary TCP data path functions off-loaded onto the I/O adapter 12 shown in FIG. 1. The I/O adapter includes means 60 for parsing an inbound TCP header, means 61 for building an outbound TCP header, means 62 for locating a connection using inbound IP version 4 (IPv4) and TCP headers, means 63 for obtaining a value of a maximum transmission unit (MTU) parameter associated with a network path, means 64 for managing TCP sliding windows, means 65 for acknowledging data from outbound the network node, means 66 for acknowledging data inbound to the network node, and means 67 for reassembling out-of-order inbound data. The I/O adapter also includes means 41 for processing TCP segmentation operations, means 42 for processing timers associated with network functions, and means 43 for managing data retransmissions.

Figure 6:
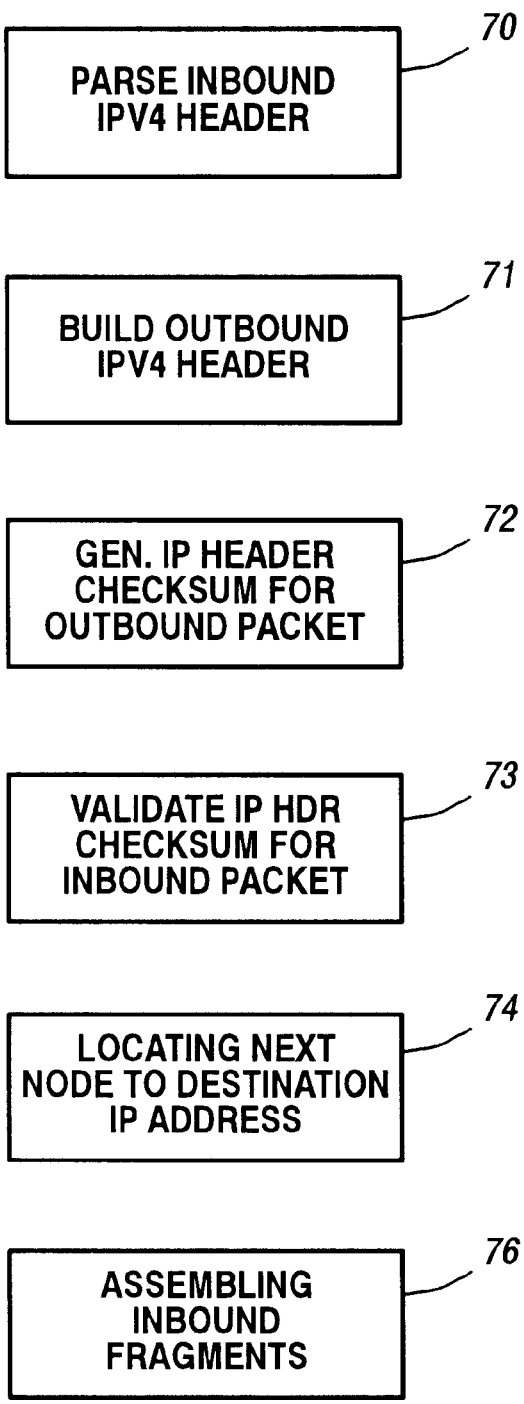
FIG. 6 is a diagram of exemplary IP data path functions off-loaded onto the I/O adapter shown in FIG. 1.

FIG. 6 is a diagram of exemplary IP data path functions off-loaded onto the I/O adapter 12 shown in FIG. 1. The I/O adapter includes means 70 for parsing an inbound IP version 4 (IPv4) header, means 71 for building an outbound IPv4 header, means 72 for generating an IP header checksum associated with a packet outbound from the network node, means 73 for validating an IP header checksum associated with a packet inbound from the network node, means 74 for locating the next network node in the path to a destination IP address, and means 76 for assembling inbound fragments.

It is to be understood that the order of the various functional blocks as shown in FIGS. 3–6 is purely illustrative. Specifically, the order shown in those drawings is not intended to suggest an order of execution, or any hierarchical format or organization for software modules implementing those functional blocks. Instead, those skilled in the art will recognize that these blocks can be arranged as appropriate in a given implementation.

IMPLEMENTATION OF AN EXEMPLARY EMBODIMENT

Here an exemplary implementation of the SDP protocol is described. In this exemplary implementation, the SDP protocol is described in the context of the I2O architecture, as promulgated by the I2O SIG (www.i2osig.org). In this discussion, the following acronyms are used frequently:

OSM (Operating System Services Module): The OSM provides an interface to the operating system that is resident on the network host. This interface allows the operating system to communicate with the network adapter using a neutral, message-based protocol that is independent from both the bus topology connecting the network adapter to the network host and the operating system resident on the network host. In this manner, the OSM isolates the outside world from the details of the operating system residing on the network host. An exemplary OSM is the intermediate message layer 21 shown in FIG. 2. For further details on an OSM, please see the I2O specification at www.i2osig.org.

ISM (Intermediate Services Module): The ISM is a counterpart to the OSM, and interfaces to the specific device or controller being accessed by the operating system. The ISM converts the neutral messages described above into device-specific commands appropriate for the specific device or controller. In this manner, the ISM isolates the outside world from the details of the hardware implementation of the network adapter. An exemplary ISM is the intermediate message layer 22 shown in FIG. 2. For further details on an ISM, please see the I2O specification at www.i2osig.org. The ISM described here in the context of I2O is not to be confused with the SDP ISM (Split Data Path Intermediate Services Module) described elsewhere throughout this document. The SDP ISM is not necessarily used in conjunction with the I2O ISM described here.

Scope

The Split Data Path (SDP) protocol refers to a distributed network architecture that executes the data path functions of TCP/IP on multiple intelligent adapters. SDP defines the distribution of the following TCP functions: TCP checksum, TCP segmentation, TCP timers (except keep alive), send retransmissions, TCP level acknowledgments (send and receive), receive data assembly and resequencing, and inbound IP fragment assembly.

SDP assumes a fully functioning TCP/IP stack on the host that serves as a single point of control for application interface management, connection management, routing functions, UDP, full stack functions for coexistence with conventional NIC(s), and other functions not involving TCP data path processing.

This description provides data flows, message structures and descriptions of how to use these data flows and message structures. The context of the protocol is I2O version 1.5. SDP can be viewed as a proprietary extension of the I2O 1.5 specification using the private message class. Familiarity with I2O, general networking, and TCP/IP concepts is assumed.

Interdependencies

The SDP OSM works in conjunction with a SDP ISM. Currently the only SDP ISM implementation is for Ethernet LAN. Support for WAN is within the scope of the architecture but the exemplary embodiment described here focuses on an Ethernet LAN implementation.

Functional Overview

Figure 7:
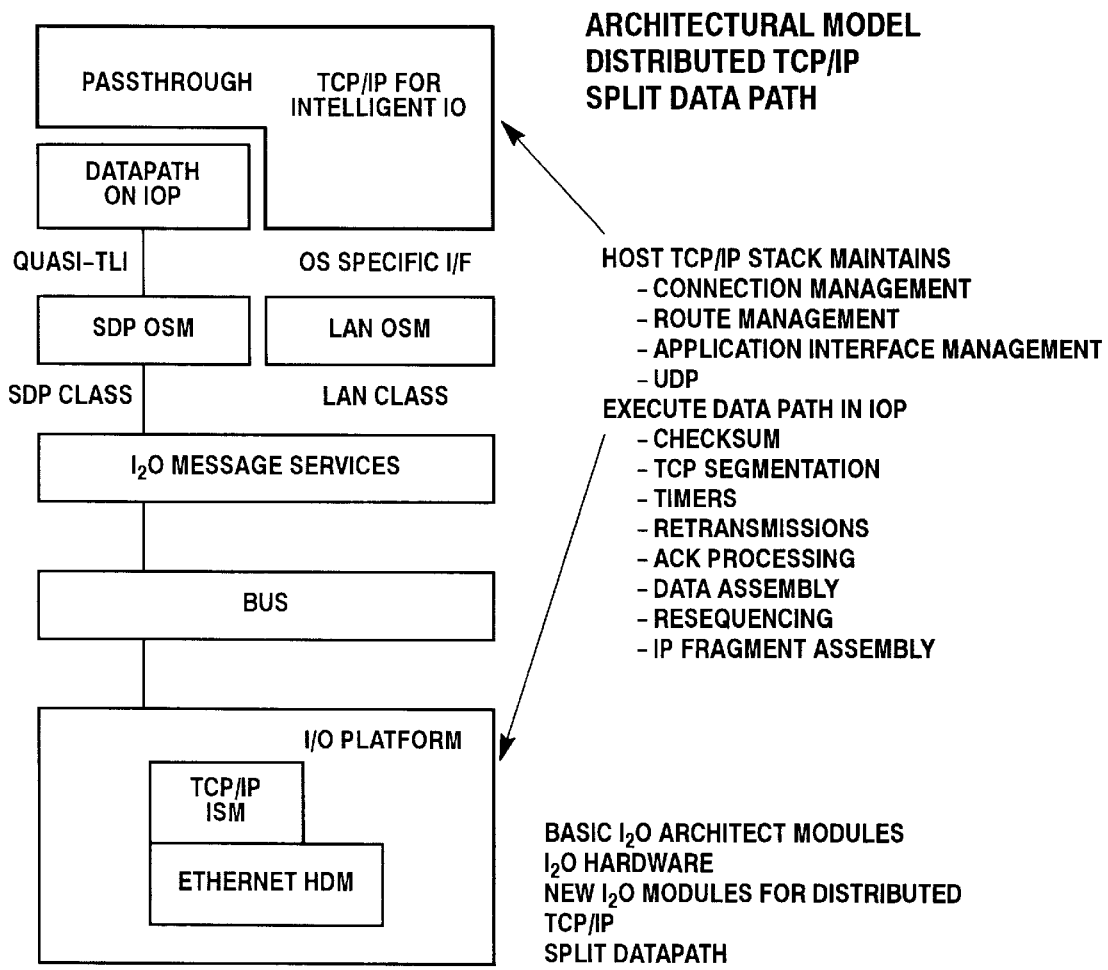
FIG. 7 is a diagram illustrating an exemplary implementation of the SDP protocol in the context of an intermediate messaging layer.

FIG. 7 is a diagram illustrating an exemplary implementation of the SDP protocol in the context of an intermediate messaging layer, such as the I2O architecture. There are several possible implementation strategies for development of a SDP OSM, some of which are:

1) Implement an SDP OSM separate and independent for the TCP/IP stack and define an OS specific interface between TCP/IP and the 'top' of the OSM.
2) Implement a filter driver that site between TCP and sockets that serves as a SDP OSM.
3) Modify the TCP/IP stack to function as the SDP OSM.

There are numerous other strategies and variations on the above. The best implementation strategy depends on OS architecture, implementation specifics of the host TCP/IP stack, the degree to which the host TCP/IP stack may be modified, and the I2O implementation on the OS.

Protocol Description

Initialization and Utility Messages

Initialization and utility messages are handled very similarly to the handling for the LAN class. However, all protocols are completely separate from the LAN OSM. The SDP OSM is transparent to the LAN OSM. Receive buckets are posted and returned in an SDP Receive Reply message with inbound data from the network. Connection termination, as with establishment, requires coordination between the SDP OSM and the SDP ISM.

Connection Management and Data Transfers

Figure 8:
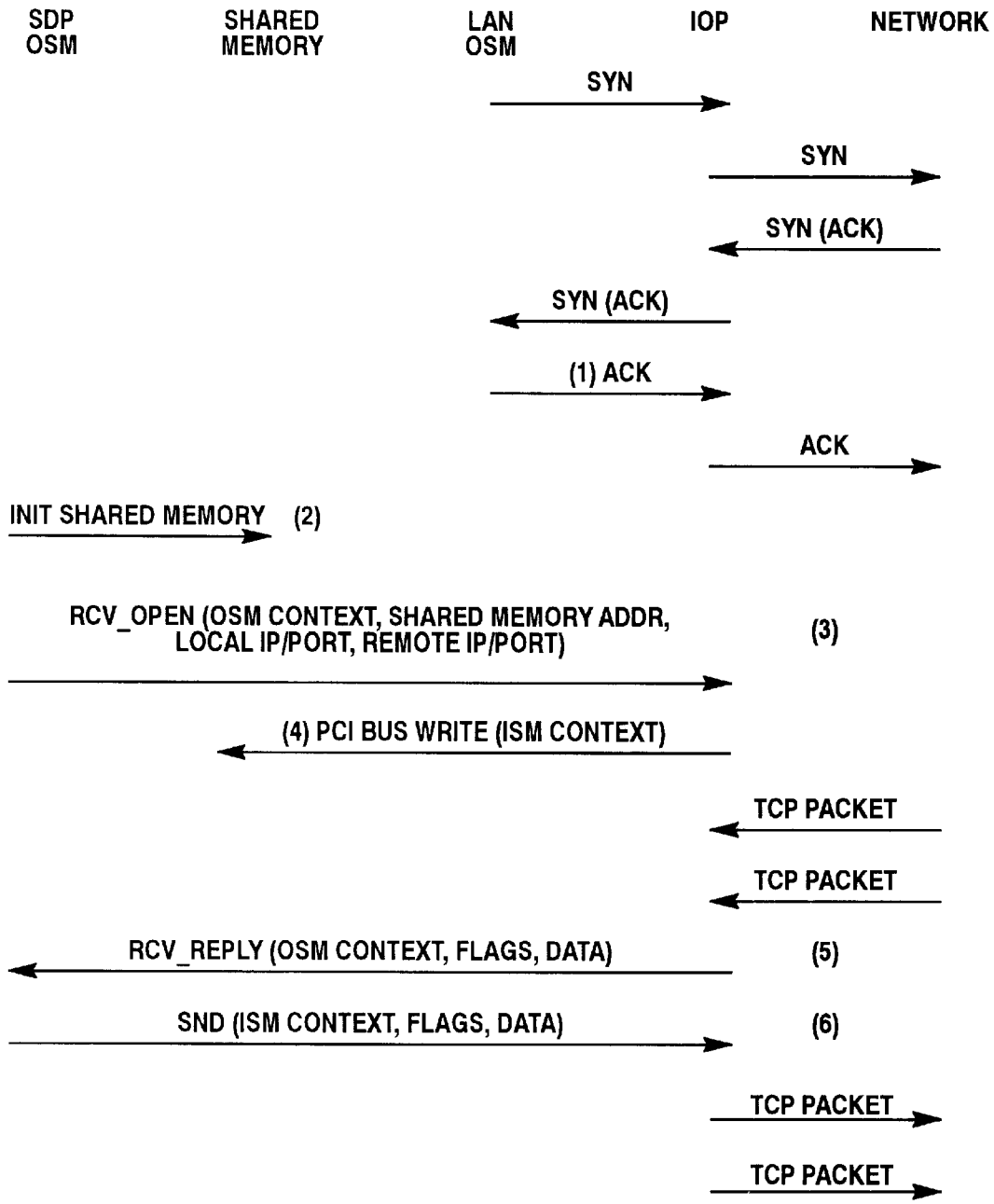
FIG. 8 is a diagram illustrating an exemplary message exchange for connection management and data transfers.

FIG. 8 is a diagram illustrating an exemplary message exchange for connection management and data transfers. The various stages of this exchange are:

1) Operating System specific interfaces exist between the LAN OSM, host TCP/IP (not shown), and SDP OSM. Some combination of those interfaces communicates to the SDP OSM the successful establishment of the TCP connection.
2) For each connection there is an area of memory on the host that is shared between the SDP OSM and SDP ISM with an agreed upon format. The memory is used primarily during connection establishment and termination, and for flow control situations. The SDP ISM rarely touches the shared memory during normal TCP protocol operation. Among other items the SDP OSM records the OSM context for the connection.
3) The RCV_OPEN is the SDP message that coordinates connection establishment between the SDP OSM and the SDP ISM. The SDP ISM uses the socket information to find the data structures allocated during connection establishment and records the OSM context for the connection. The RCV_OPEN also enables the SDP ISM to begin forwarding receive data for the connection to the SDP OSM. Note that the SDP ISM handles the case where the ACK from the LAN arrives before the RCV_OPEN due to timing issues on the host.
4) The SDP ISM records the address of the shared memory area. A single PCI Bus write is made the memory area to record the SDP ISM context for the connection.

5) The SDP ISM receives data packets for the connection, assembles the data, copies the data into one or more SDP OSM buckets, and issues a RCV_REPLY. The SDP ISM will batch receive data if the receive rate is sufficient to justify batching. The RCV_REPLY contains the bucket(s), several flags, and the OSM context. The SDP OSM uses the OSM context to efficiently find the data structure(s) associated with the TCP connection.
6) The SDP OSM sends data via SND requests. The SDP ISM context allows the SDP ISM to efficiently find the data structures for the connection.

"Early" Data Send

Figure 9:
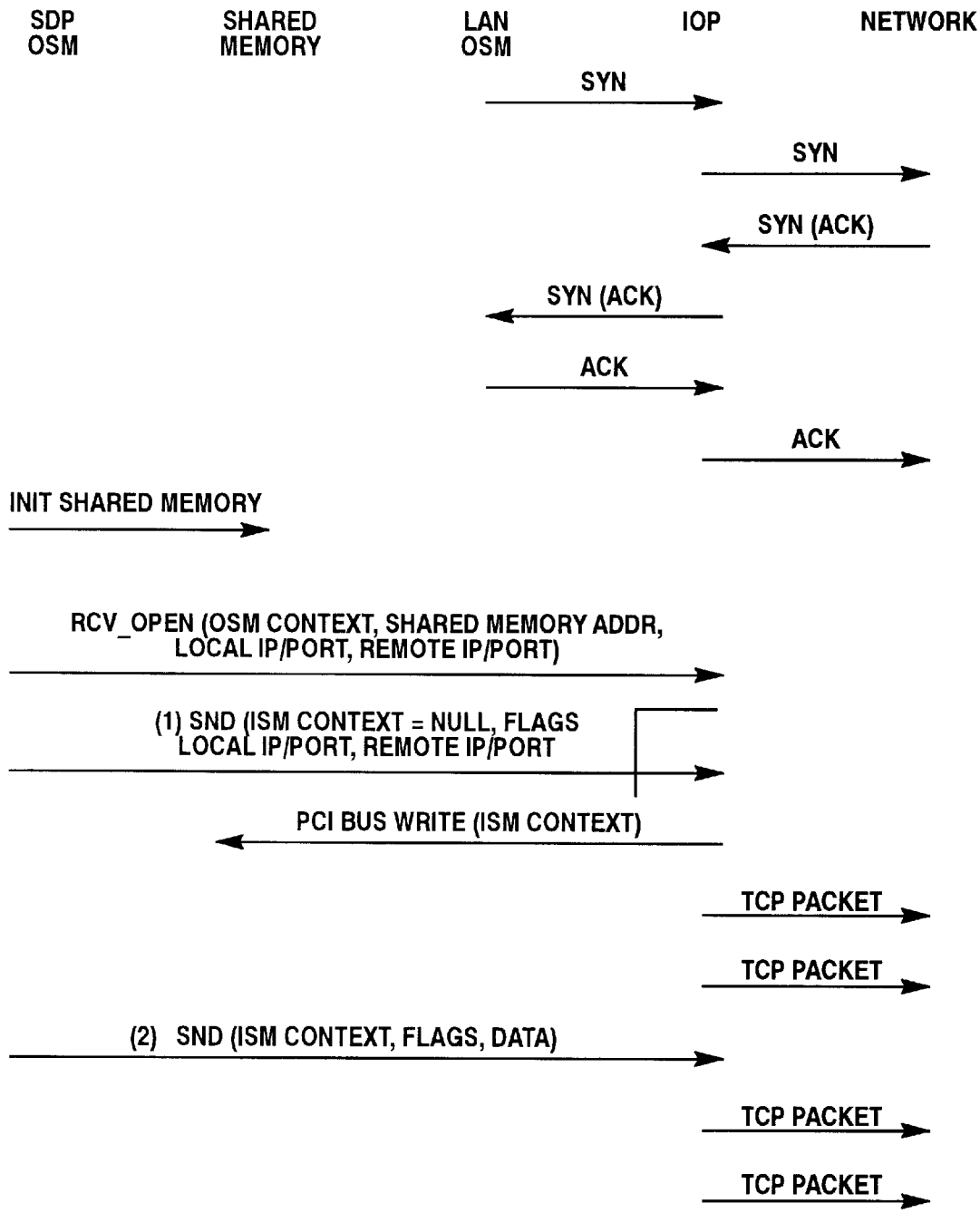
FIG. 9 is a diagram illustrating an exemplary message exchange for an "early" data send.

FIG. 9 is a diagram illustrating an exemplary message exchange for an "early" data send. The various stages of this exchange are:
1) Connection establishment completes normally. The SDP OSM has data to send. It has not received the RCV_REPLY to the RCV_OPEN, and the SDP ISM context in the shared memory area is NULL, so in this sense, the data send is "early". The SDP OSM can still send data (avoiding any latency) by including the socket information in the send. The SDP ISM finds the SDP ISM context NULL and uses the socket information to find the associated connection.
2) On the second send, the SDP OSM finds the SDP ISM context in the shared memory area something other than NULL, records it in its appropriate data structure, and issues a normal send.

"Early" Data Receive

Figure 10:
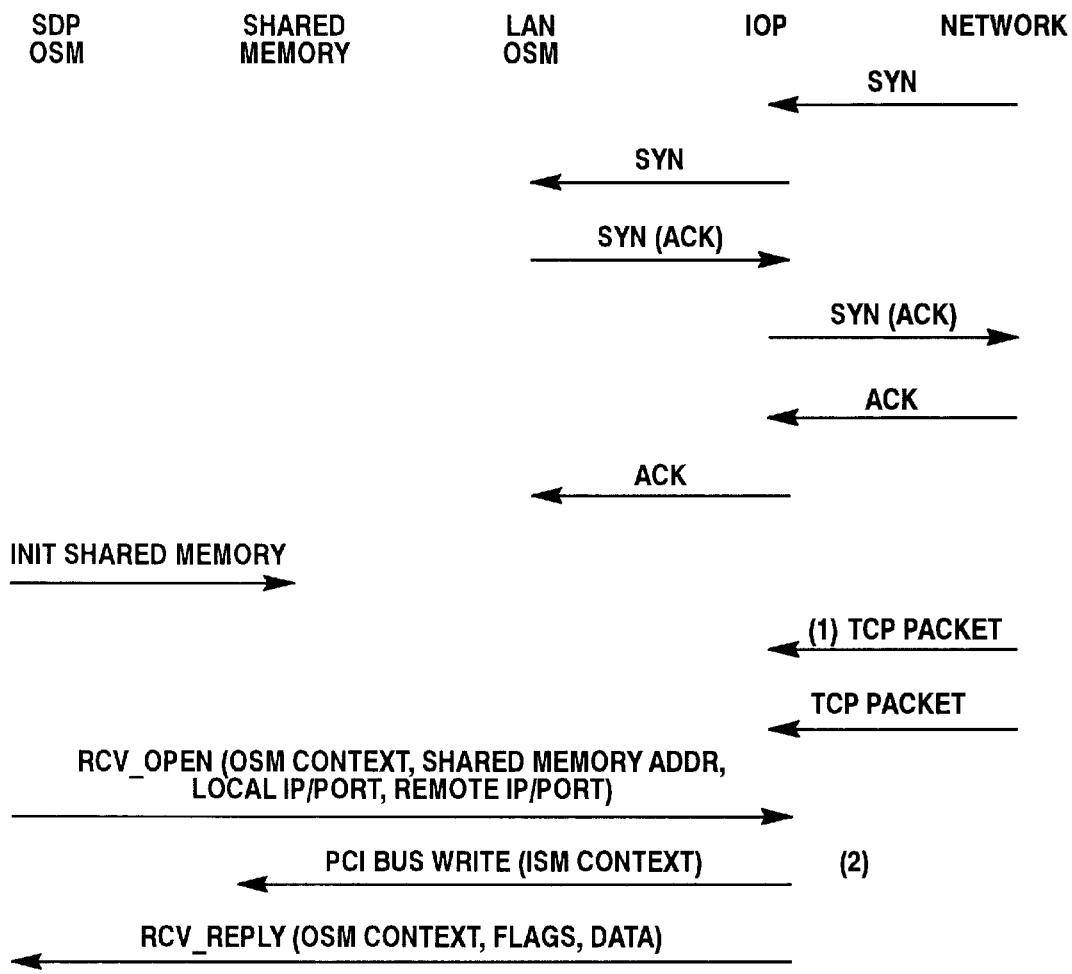
FIG. 10 is a diagram illustrating an exemplary message exchange for an "early" data receive.

FIG. 10 is a diagram illustrating an exemplary message exchange for an "early" data receive. The various stages of this exchange are:
1) The SDP ISM receives packets for a connection that is has recently moved to the established state. The SDP ISM tanks the data until the RCV_OPEN is processed.
2) After the RCV_OPEN is processed a RCV_REPLY is issued to the SDP OSM.

Receiving Multiple Replies Per RCV Request

Figure 11:
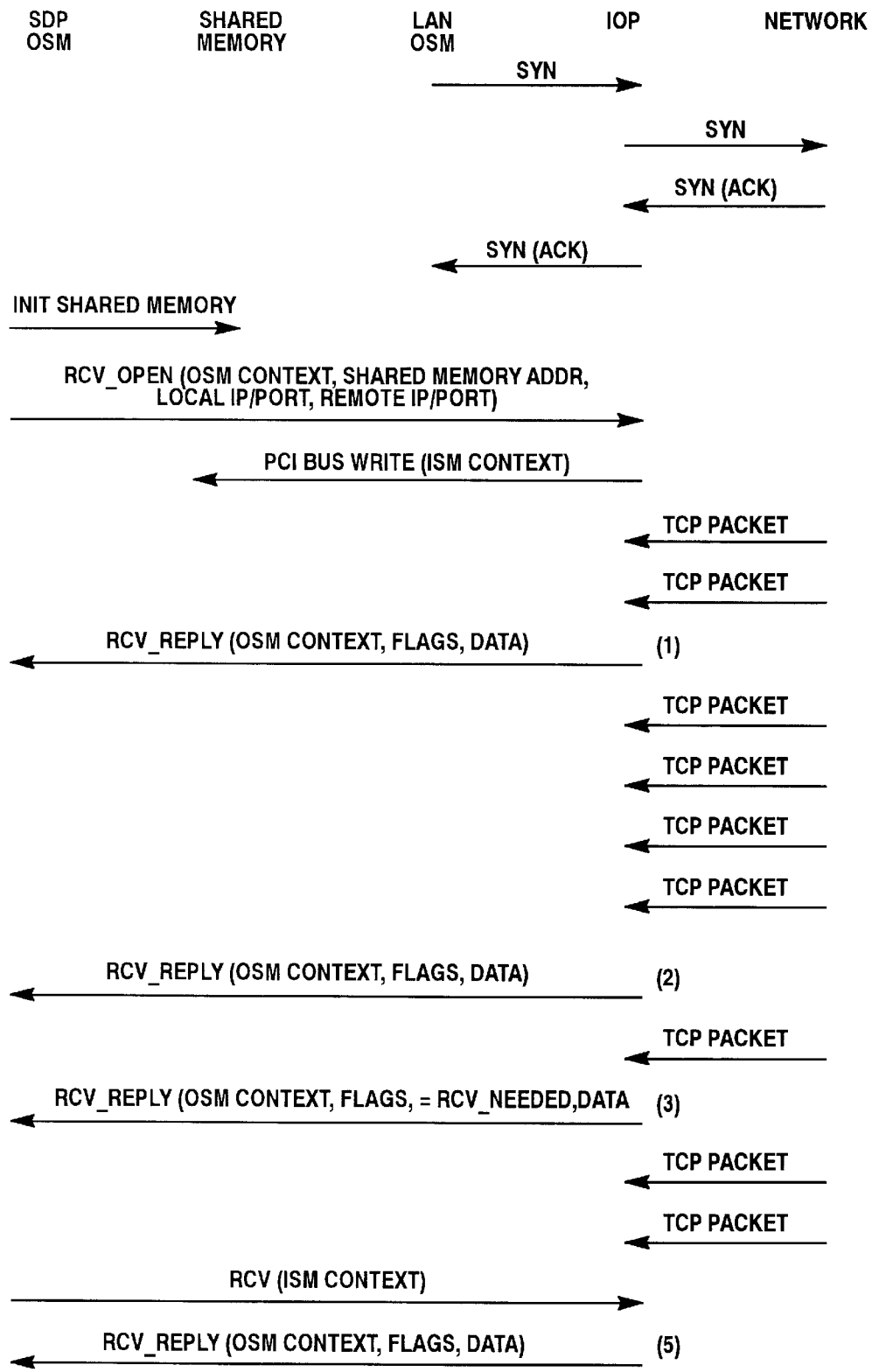
FIG. 11 is a diagram illustrating an exemplary message exchange for receiving Multiple Replies Per RCV Request.

FIG. 11 is a diagram illustrating an exemplary message exchange for receiving Multiple Replies Per RCV Request. The various stages of this exchange are:
1) This diagram shows normal connection establishment with the first inbound data replied to.
2) Each RCV request can support multiple Replies, and the SDP ISM replies with data again.
3) This Reply is different. The SDP ISM will send a specific amount of data to the SDP ISM per RCV request. The amount of data the SDP ISM will forward to the host per RCV request is based largely on the current size of the receive window. On the last Reply a bit is set that requires another RCV Request before any other data can be forwarded to the host. Depending on circumstances in the IOP, the SDP ISM may optionally set the "need reply" bit on every RCV reply.
4) A RCV Request has been requested, but not yet received. So the SDP ISM accepts and queues inbound data for that connection.
5) When the next RCV request is processed the cycle starts again. Note that the SDP OSM supplies the SDP ISM context in the RCV request so the SDP ISM can efficiently find the data structures associated with the connection.

PUSH Flag in Receive Buckets

Figure 12:
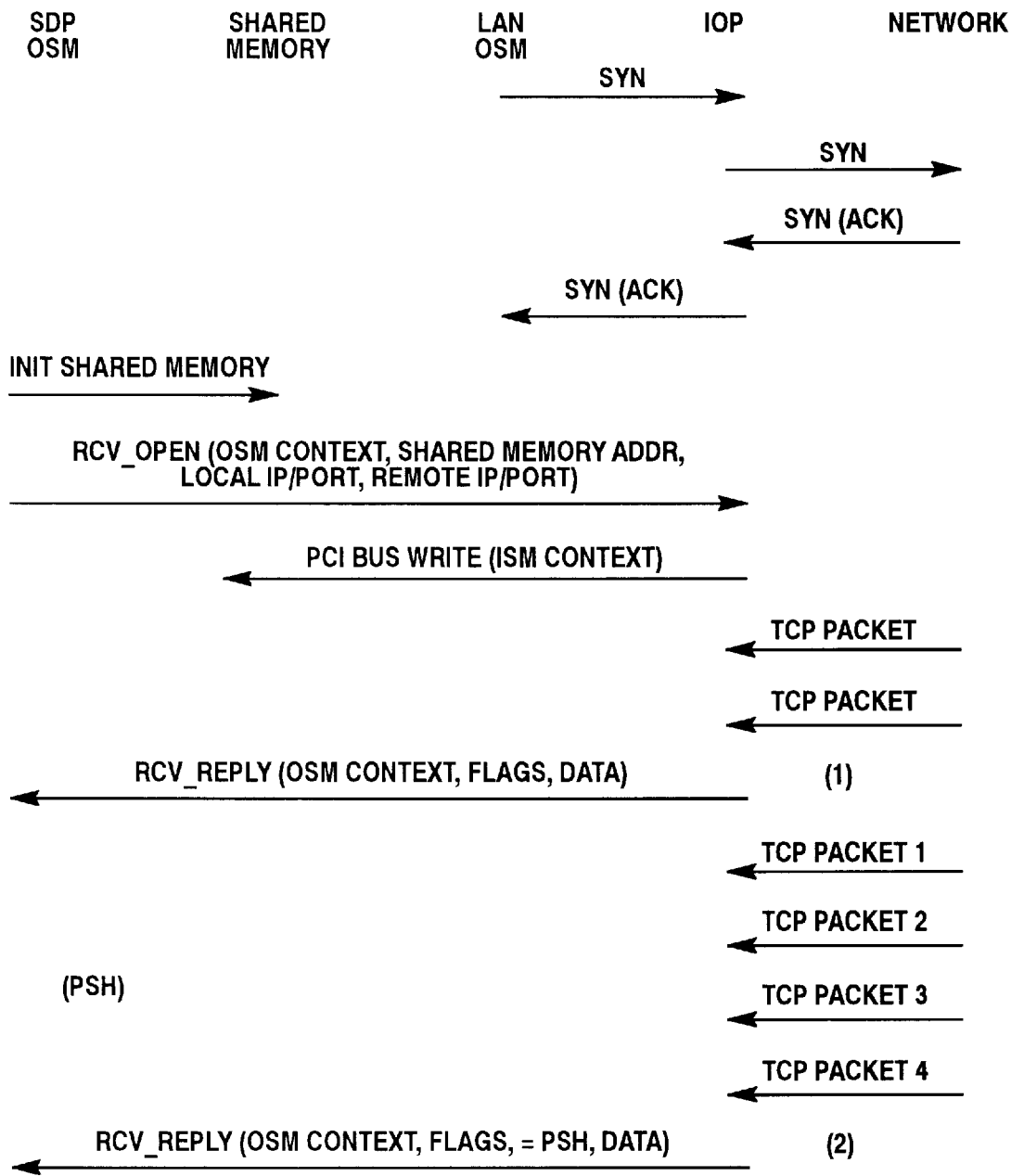
FIG. 12 is a diagram illustrating an exemplary message exchange related to the PUSH flag In Receive Buckets.

FIG. 12 is a diagram illustrating an exemplary message exchange related to the PUSH flag In Receive Buckets. The various stages of this exchange are:
1) Normal connection establishment with the first RCV_REPLY.
2) Four packets will be batched to the SDP OSM. Packet3 has the PUSH flag set. The data for Packet3 is copied into one or more buckets. The bucket that holds the last byte of data of Packet3 will not contain any data from Packet4, though it may contain data from Packet2 (or Packet1). The PUSH flag is set for the bucket holding the last byte of data from Packet3. The RCV_REPLY contains a bucket with data from Packet4.

Using and Reusing Send Buckets

Figure 13:
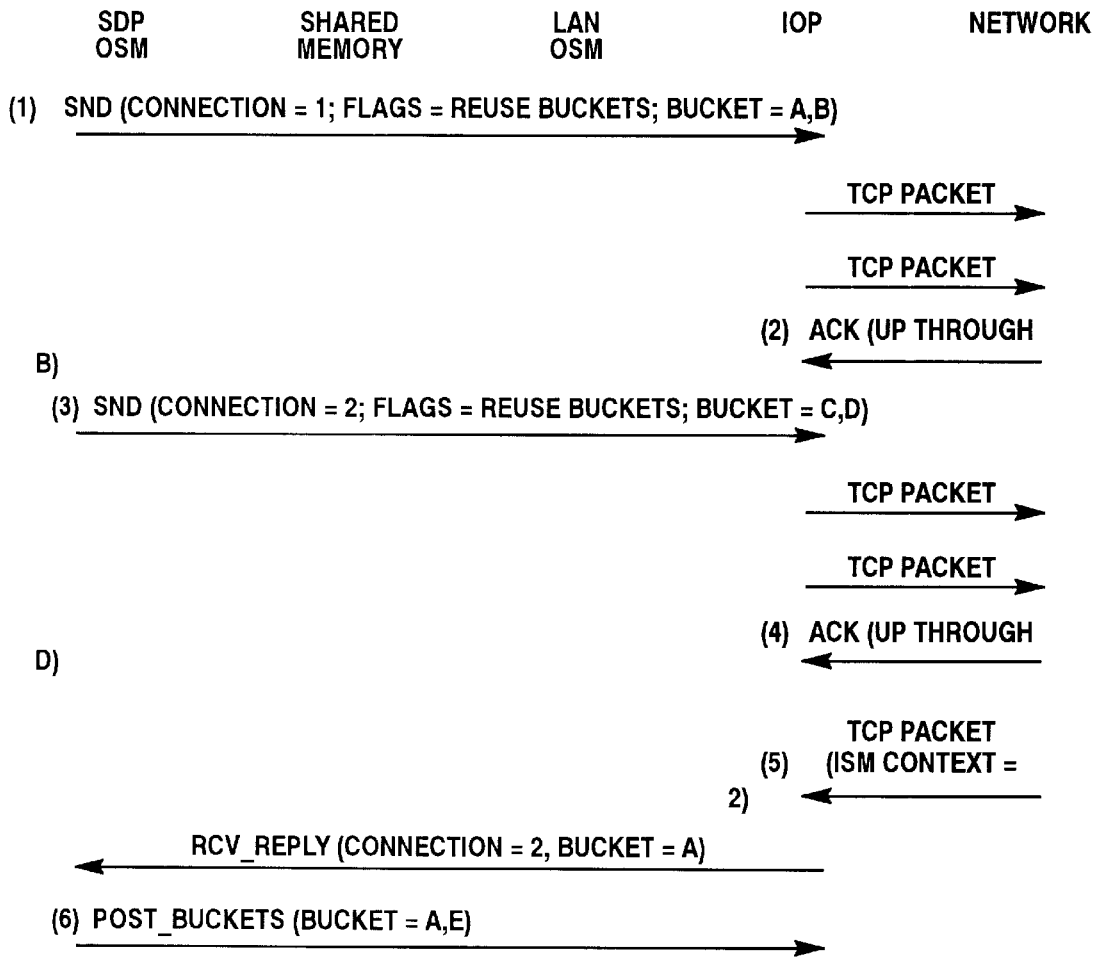
FIG. 13 is a diagram illustrating an exemplary message exchange related to Using and Reusing Send Buckets.

FIG. 13 is a diagram illustrating an exemplary message exchange related to Using and Reusing Send Buckets. The various stages of this exchange are:
1) The SDP OSM sends data to the SDP ISM for connection 1. The data is copied from application memory into two buckets: A and B. The SDP OSM can chose to "complete" the application send request immediately if it wishes since the SDP ISM, via the TCP protocol, will guarantee that the data in buckets A and B will be delivered to the remote node. The OSM may wish to record that buckets A and B are associated with the particular IOP; if the IOP fails the SDP OSM will lose the connections through that IOP, but can recover the memory by searching the buckets and finding those associated with that IOP.
2) When all the data in a bucket is acknowledged by the remote node the send buckets are moved to the receive bucket free pool as though acquired through a POST_BUCKET request from the SDP OSM. Buckets A and B can now be filled with data for any connection. Buckets A and B will not be used for data flowing to the LAN OSM.
3) The SDP OSM sends data in buckets C and D.
4) The SDP ISM moves buckets C and D to the receive bucket free pool.
5) The SDP ISM copies data for connection 2 into bucket A, even though bucket A was previously used for connection 1 in a send request.
6) The SDP OSM can use bucket A in another send request or as a receive bucket. This example shows it using it being used in a POST_BUCKET request.

Using Application Memory with Optimized Reply

Figure 14:
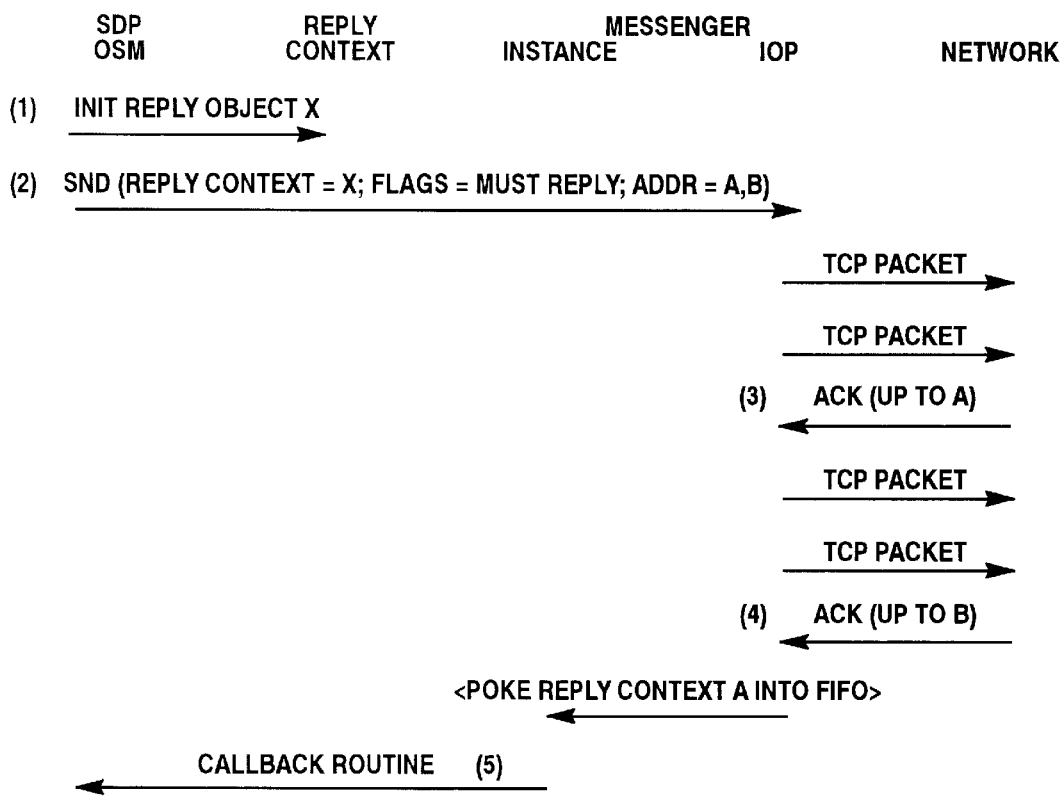
FIG. 14 is a diagram illustrating an exemplary message exchange related to Using Application Memory with Optimized Reply.

FIG. 14 is a diagram illustrating an exemplary message exchange related to Using Application Memory with Optimized Reply. The various stages of this exchange are:
1) This example shows how to use an optimized reply, which is a faster way for a SDP ISM to "reply" to an OSM. A special reply context is inserted in the request. When a SDP ISM replies to the request it does not build a full I20 reply, it simply pokes the reply context into the host's FIFO queue. The context is an address that the I20 Messenger Instance can recognize as not being an MFA (an I20 buffer). The optimized reply context is a pointer to a memory area that is OS specific. One possible implementation of an optimized reply context memory area is as follows:

| Optimized Reply Signature \| context | Call back routine \| | Request |
|---|---|---|

The Optimized Reply Signature is a validity check on the context memory area. If the signature is valid, the messenger instance invokes the call back routine, and passes the optimized reply context as a parameter. The SDP OSM can use the Request Context to associate the reply to the original request (see #5).

2) The SDP OSM does not have to copy application data into a bucket. To eliminate a data copy on the host, the SDP OSM can send a set of application memory descriptors to the SDP ISM. The SDP ISM will use those addresses in place of buckets to DMA the outbound data. The SDP OSM cannot complete the application send until the SDP ISM informs the SDP OSM that all the data in the send has been acknowledged by the remote node (at the TCP level). The SDP OSM sets the "must reply" flag; the SDP ISM will reply after all the data in this send is acknowledged.

3) Data up through memory descriptor A is acknowledged. Not all of the data in memory descriptor B has been acknowledged yet.

4) Data up through memory descriptor B is acknowledged. This is the last data in the send request. The SDP ISM replies to the SDP OSM via the optimized reply mechanism. Note that the "must reply" can be used with both buckets and application memory addresses.

5) The callback routine is invoked by the I2O Messenger Instance. The SDP OSM correlates this call back to the original send request and completes the application send.

Using a Flow Control Bit

Figure 15:
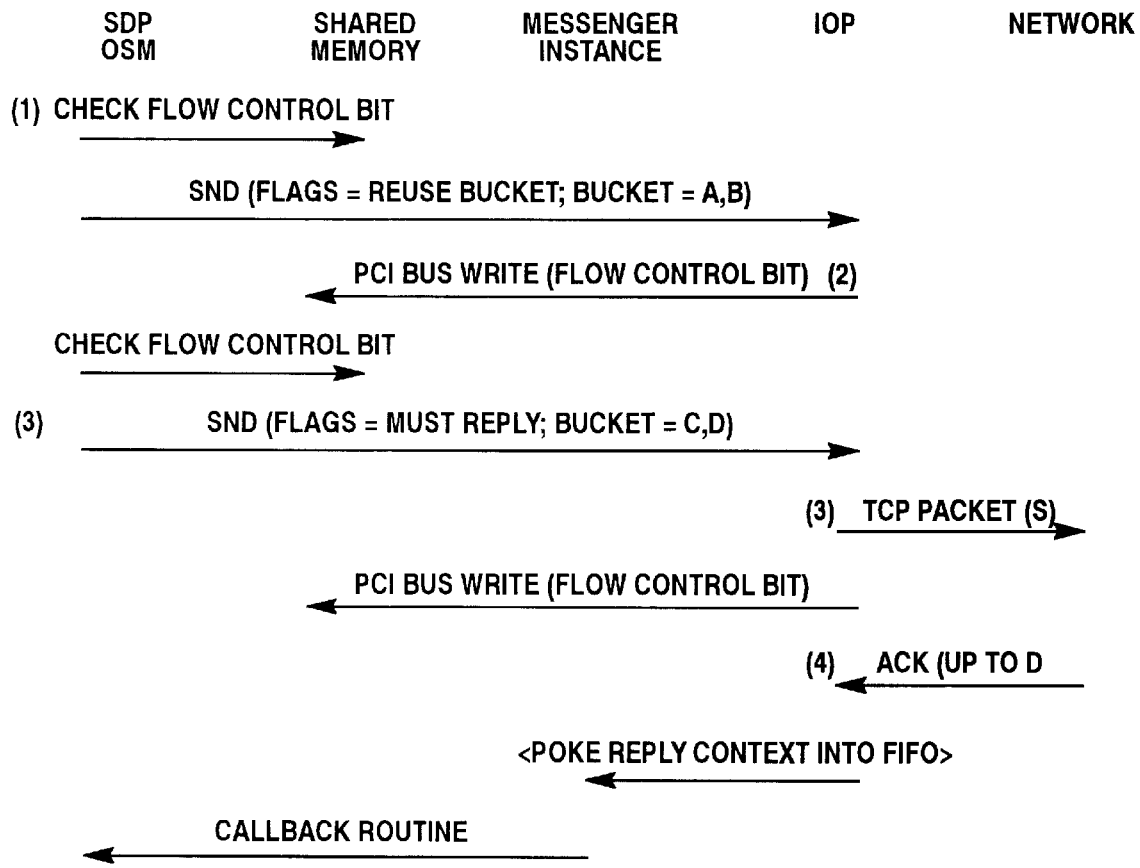
FIG. 15 is a diagram illustrating an exemplary message exchange related to using a Flow Control Bit.

FIG. 15 is a diagram illustrating an exemplary message exchange related to using a Flow Control Bit. The shared memory area contains a bit that can be read by the SDP OSM to see if the connection is congested in the outbound direction. See the diagram Normal Connection Establishment in FIG. 11 above for a description of the shared memory area. The various stages of this exchange are:

1) When the SDP OSM check s the flow control bit, a zero stored in that bit indicates e s that no congestion exists. In this example, the SDP OSM issues a send with buckets, but any kind of send can be used regardless of the state of the flow control bit.

2) The SDP ISM processes the send request and queues that data. The amount of queued data is now greater than the send flow control threshold and the SDP ISM issues a PCI bus write to set the flow control bit. The SDP ISM takes no other action. The send flow control threshold is based largely on the current size of the send window.

3) On the second send, the SDP OSM finds the send flow control bit set. The SDP OSM may choose to ignore the congestion bit and base its flow control on some other indicator, such as memory used for the connection. In this example, the SDP OSM builds the send request and sets the "must reply" bit in the flags. The OSM copies the data into buckets C and D, but could just as well use application memory. After this send, the SDP OSM may wish to queue or fail subsequent application writes. Since the SDP ISM will notify the SDP OSM when the data has been acknowledged, it might use this as a form of flow control. The SDP ISM might also periodically issue a SND with the "must reply" bit set as a form of windowing. The former mechanism might be less expensive, but would cause some latency between flow control transitions. The latter mechanism would minimize or eliminate the latency, but would be slightly more expensive. Any flow control mechanism between itself and the application is OS specific.

4) When the amount of outbound queued data falls below a specific level (again based largely on the current size of the send window), the SDP ISM resets the flow control bit to zero. The SDP ISM is not notified that the bit is reset. Resetting the flow control bit is also completely independent of any outstanding "must reply" send requests. The flow control bit is set/reset based on the amount of data being held for the connection and send requests with the "must reply" bit is replied to when all the data for that send is acknowledged by the remote node. In this exemplary embodiment, this method of flow control is preferable to message based flow control notification, which may be too expensive for this type of environment.

Normal Connection Termination

Figure 16:
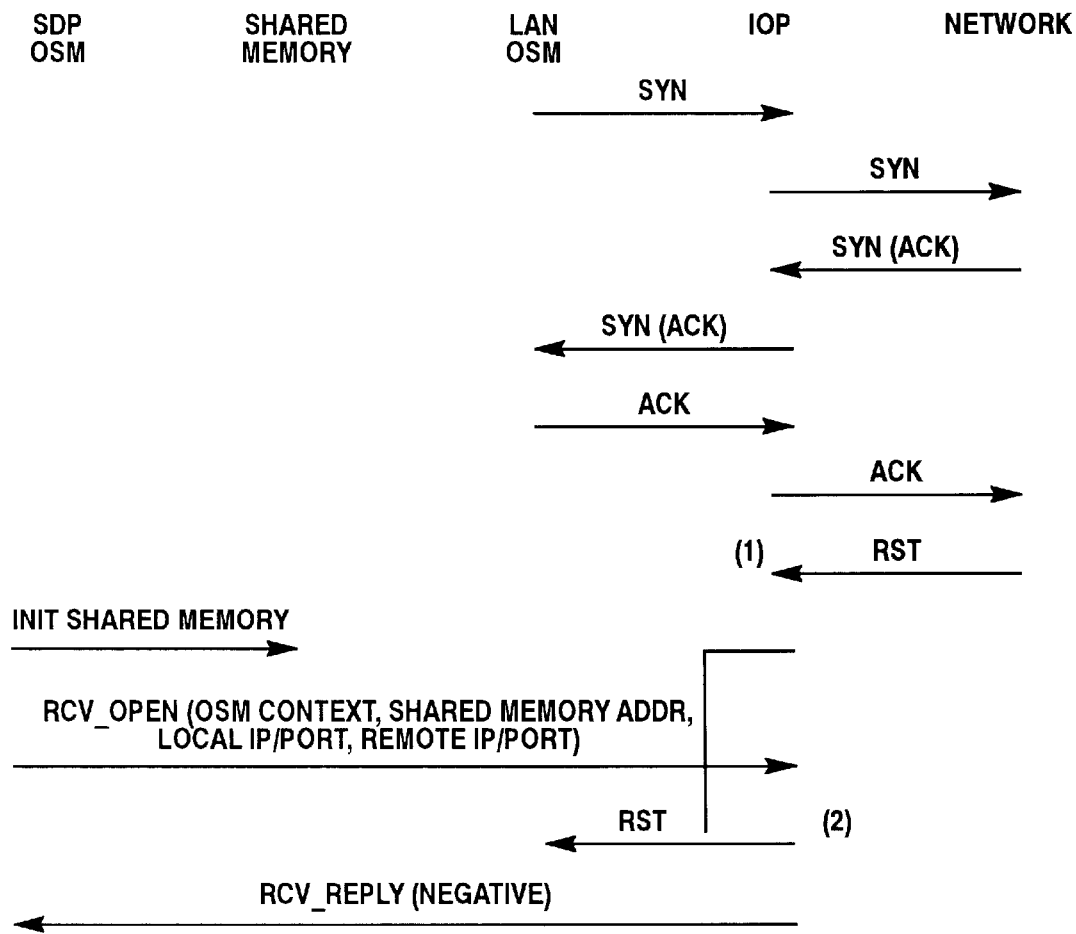
FIG. 16 is a diagram illustrating an exemplary message exchange related to Normal Connection Termination.

FIG. 16 is a diagram illustrating an exemplary message exchange related to Normal Connection Termination. The various stages of this exchange are:

1) The SDP ISM receives data with FIN set. The data is forwarded to the SDP OSM. Each RCV_REPLY contains a 16 bit Reply Number that is incremented by the SDP ISM every time a RCV_REPLY is sent to the host. The SDP OSM is responsible for recording the last Reply Number processed.

2) The shared memory area contains a field for the Reply Number and an EOD bit. At connection establishment time the SDP OSM initializes the EOD bit and Reply Number to 0. When the SDP ISM receives a FIN, it performs a PCI Bus Write to set the EOD bit to 1, and to set the Reply Number to the last RCV_REPLY returned to the SDP OSM with data. At this time an ACK is sent for the data only; the FIN is not ACKed. The timing of the RCV_REPLY, the ACK of the data, and the PCI Bus Write is undefined; these events can happen in any order.

3) The SDP OSM sends a full TCP/IP packet to the LAN OSM for the connection with the FIN bit set. The sequence numbers in this packet reflect the state of the connection immediately after the establishment handshake. From the host TCP/IP perspective, no data has been sent or received; it looks like the connection came established and then terminated with no data.

4) The SDP OSM is informed of the inbound FIN and checks the shared memory area to see if it has processed the last RCV_REPLY. The EOD bit is set, and the Reply NBR matches the last one processed, so the SDP OSM knows that no more inbound data will be arriving for the connection. Note that the PCI Bus Write will always be executed before the TCP/IP FIN is forwarded to the LAN OSM. However, the timing of the RCV_REPLY and the notification of the inbound FIN to the SDP OSM (via the host TCP/IP stack) are undefined and these events can happen in any order.

5) Host TCP/IP sends and ACK for the FIN. The IOP adjusts the sequence numbers to reflect the data that has been sent and received for forwarding the FIN, ACK to the network.

6) The application sends its last data and indicates that it is terminating its half of the connection. The SDP OSM sends the data to the SDP ISM with the EOD bit set. If the application terminates its half of the connection without any data, the SND request has no data and the transaction header indicates EOD. The SDP OSM informs the host TCP/IP that the application is closing its half of the connection.

7) *** The EOD bit may be eliminated from the SND request and replaced by a similar mechanism as used to coordinate inbound termination.

8) The SDP ISM sends the data but does not yet indicate a FIN. If no data is associated with the EOD SND, the SDP ISM simply records that it received EOD from the SDP OSM.

9) The LAN OSM sends the FIN to the SDP ISM. The sequence numbers in the packet from the LAN look like no data has been sent for the connection. The SDP ISM makes sure that it has sent all the data it has to send, then sends a packet with the FIN bit set. Note that the timing of the FIN from the LAN and the SND with the EOD bit is undefined; they can reach the SDP ISM in any order.

10) When the outbound FIN is ACKed, the IOP builds a full TCP/IP packet that ACKs the FIN and forwards it to the LAN OSM.

Failure Due To Connection Reset

Figure 17:
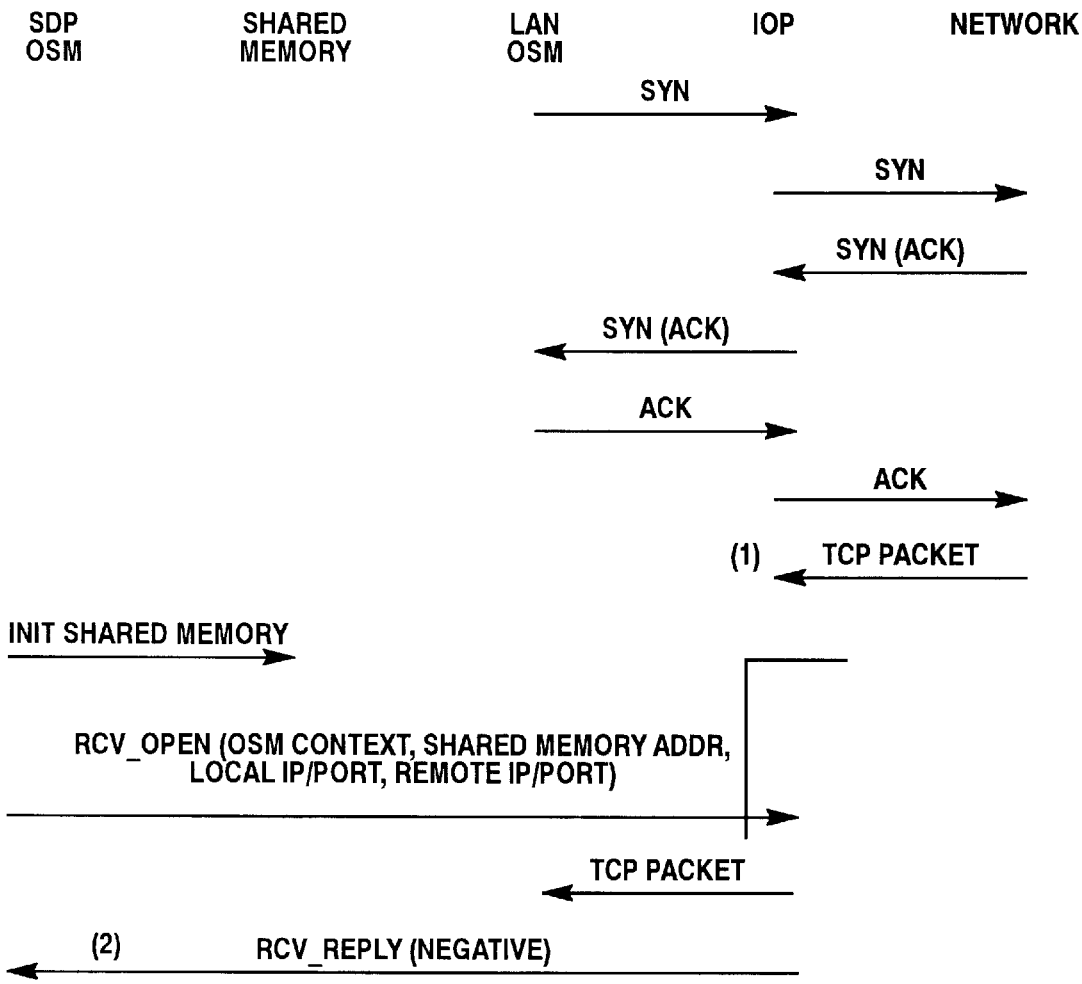
FIG. 17 is a diagram illustrating an exemplary message transfer related to RCV_OPEN Failure Due To Connection Reset.

FIG. 17 is a diagram illustrating an exemplary message transfer related to RCV_OPEN Failure Due To Connection Reset. The SDP OSM must handle a negative reply to the RCV_OPEN request. The RCV_OPEN can fail for several reasons. This example shows a negative reply due to a Reset from the network. The various stages of this exchange are:

1) The SDP ISM receives a Reset just after moving to the established state. The SDP ISM cleans up its structures and forwards the Reset to the host TCP/IP.

2) The SDP ISM receives the RCV_OPEN and sends a negative reply. Some mechanism on the host must be in place between TCP/IP and the SDP OSM to coordinate termination of the connection with the application.

OPEN Failure Due To Insufficient Resources on the IOP

Figure 18:
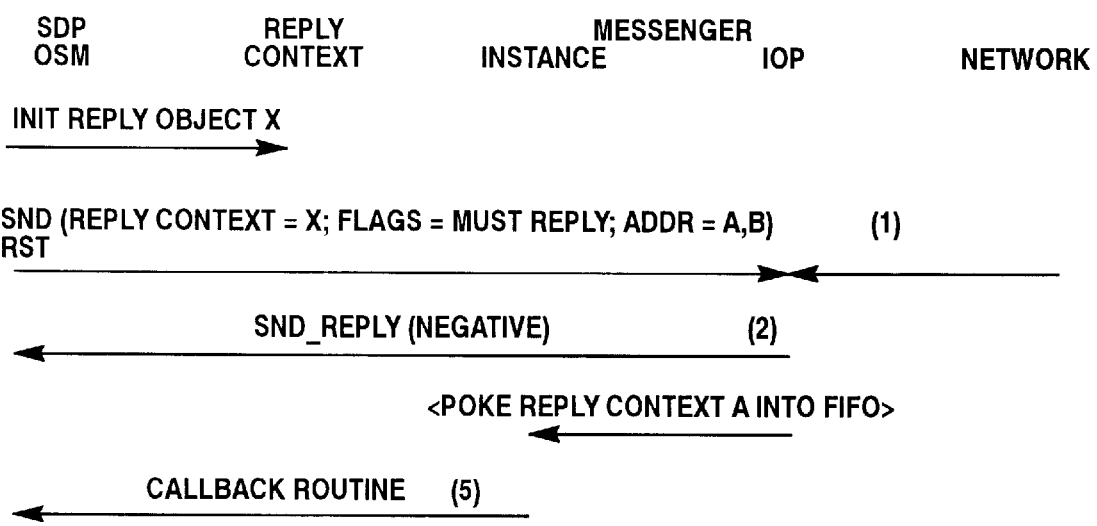
FIG. 18 is a diagram illustrating an exemplary message exchange related to RCV OPEN Failure Due To Insufficient Resources on the IOP.

FIG. 18 is a diagram illustrating an exemplary message exchange related to RCV OPEN Failure Due To Insufficient Resources on the IOP. The various stages of this exchange are:

1) The SDP ISM made a decision at connection establishment time that it cannot offload anymore connections. It receives data for the connection and forwards that data to the LAN OSM as it would for a normal LAN OSM/HDM only environment.

2) The SDP OSM receives the negative reply to the RCV_OPEN and marks the connection as not offloaded. Depending on the design of the SDP OSM on the host, the application data for non-offloaded connections may flow through the SDP OSM. If the application data flows through the SDP OSM, the timing of the inbound data (presumably from TCP/IP to the SDP OSM) is undefined relative to the timing of the negative reply to RCV_OPEN. If the SDP OSM receives real data through the conventional path prior to receipt of the negative reply to RCV_OPEN, it can assume that connection has not been offloaded, and that all subsequent data transfers are to take place via the conventional mechanism (LAN OSM).

Send Failure with Application Memory with Optimized Reply

Figure 19:
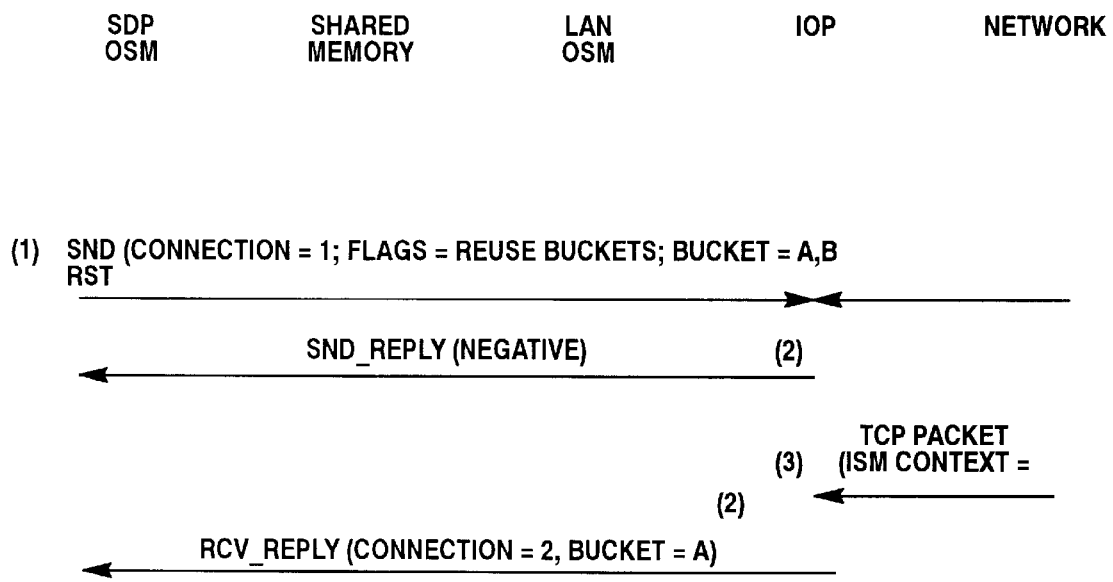
FIG. 19 is a diagram illustrating an exemplary message exchange related to Send Failure With Application Memory With Optimized Reply.

FIG. 19 is a diagram illustrating an exemplary message exchange related to Send Failure With Application Memory With Optimized Reply. The various stages of this exchange are:

1) The SDP OSM issues a SND request with application data that requires a reply. The SDP ISM receives a Reset from the network immediately before it processes the SND request. The SDP ISM forwards the Reset to the LAN OSM (not shown).

2) The SDP ISM takes two actions regarding the SND request. First, it responds negatively to the request, and because the "must reply" bit was set, it also pokes the Reply Context into the inbound FIFO. The timing of the Optimized Reply relative to the negative SND_REPLY is undefined.

Send Failure with Reusable Buckets

Figure 20:
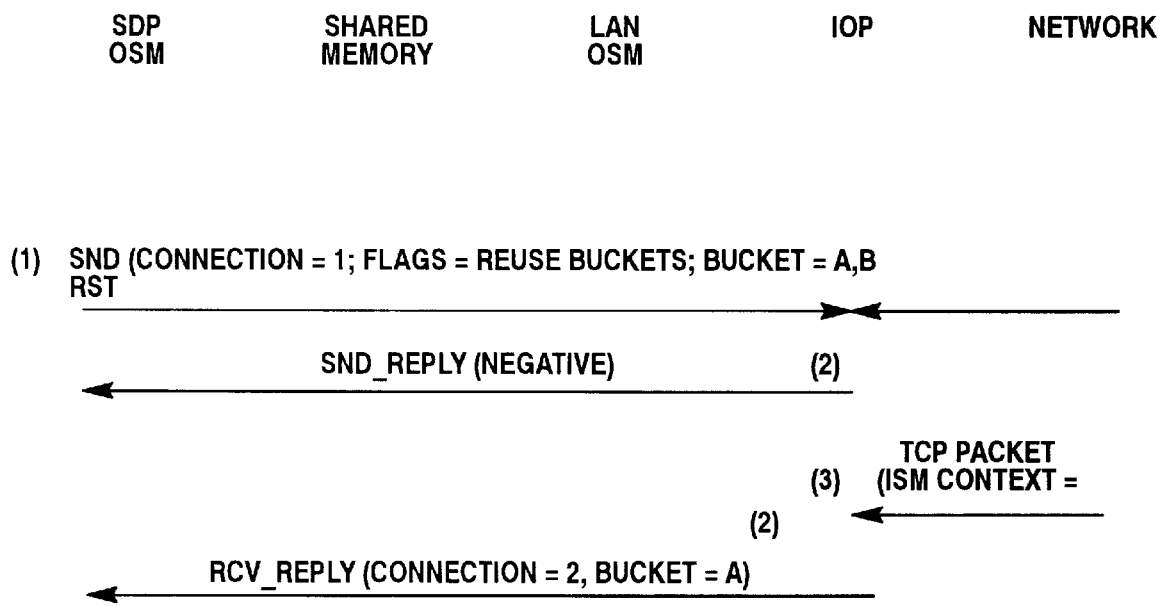
FIG. 20 is a diagram illustrating an exemplary message exchange related to Send Failure With Reusable Buckets.

FIG. 20 is a diagram illustrating an exemplary message exchange related to Send Failure With Reusable Buckets. The various stages of this exchange are:

1) The SDP OSM issues a SND request with buckets and sets the "reuse buckets" bit.

2) The SDP ISM sends a negative reply to the send request, but puts buckets A and B in its receive free pool.

3) Bucket A is used for inbound data for connection 2.

SNMP Support

The SDP OSM and SDP ISM coordinate the gathering of SNMP statistics. The SDP OSM and SDP ISM agree on an area of host memory where the SNMP statistics will reside. The area of memory is identified in the SNMPObjectArea field in the SDP_ISM_ACTIVATE_REPORTING message, which is sent to the SDP ISM during SDP OSM initialization.

The SDP ISM gathers SNMP statistics and records them in SDP ISM memory. At a periodic interval, such as 1 second in an exemplary embodiment, the SDP ISM DMAs the SNMP statistics to the pre-designated area of host memory for the host to access as necessary.

At fixed intervals, such as 1 second in an exemplary embodiment, the SDP ISM DMAs its statistics from IOP memory to the address supplied in SnmpObjBuffer.

It is understood that changes may be made to the embodiments described above without departing from the broad inventive concepts thereof. For example, the SDP protocol may be practiced with or without an intermediate message layer such as I20. Accordingly, the present invention is not limited to the particular embodiments disclosed, but is intended to cover all modification that are within the spirit and scope of the invention as defined by the appended claims.

What is claimed is:

1. A network node implementing a distributed TCP/IP network communication protocol stack, the protocol stack including a TCP layer and an IP layer, the TCP layer including a TCP management unit and a TCP data path unit, and the IP layer including an IP management unit and an IP data path unit, the network node comprising:

a network host configured with the TCP management unit and the IP management unit; and at least one I/O adapter coupled to the network host and configured with the TCP data path unit and the IP data path unit, thereby distributing the TCP data path unit and the IP data path unit onto the I/O adapter.

2. The network node of claim 1, further comprising at least a second I/O adapter coupled to said network host, the second I/O adapter providing a second TCP data path unit and a second IP data path unit.

3. The network node of claim 1, further comprising a bus coupling the network host to the I/O adapter.

4. The network node of claim 3, wherein the bus is a PCI bus.

5. The network node of claim 1, further comprising an intermediate message layer disposed between the network host and the I/O adapter, the intermediate message layer providing a device-independent link between the network host and the I/O adapter.

6. The network node of claim 5, wherein the intermediate message layer conforms to the I2O specification.

7. The network node of claim 1, wherein the network host is configured to perform at least one of connection management, route management, application interface management, and UDP management.

8. The network node of claim 1, wherein the I/O adapter is configured to perform at least one of:

IP header checksum processing,

TCP segmentation processing, timer processing, retransmission management, acknowledgement processing, inbound data assembly, inbound data resequencing, IP data fragment assembly, TCP checksum processing, TCP window management, and discovery of a maximum transfer unit (MTU) parameter associated with a given network path.

9. The network node of claim 1, wherein the network host includes means for performing at least one of the following TCP management functions:

establishing a network connection, de-establishing a network connection, and defining an interface point between an application and the network.

10. The network node of claim 1, wherein the network host includes means for performing at least one of the following IP management functions:

implementing an address resolution protocol (ARP), implementing a reverse address resolution protocol (RARP), and performing subnet addressing.

11. The network node of claim 1, wherein the I/O adapter includes means for performing at least one of:

parsing an inbound TCP header, building an outbound TCP header, finding a connection via inbound IP version 4 (IPv4) and TCP headers, obtaining a value of a maximum transmission unit parameter associated with a network path, performing TCP sliding window management, acknowledging outbound data from a remote node, acknowledging inbound data to the remote node, and reassembling out-of-order inbound data.

12. The network node of claim 1, wherein the I/O adapter includes means for performing at least one of:

parsing an inbound IP version 4 (IPv4) header, building an outbound IPv4 header, generating an IP header checksum associated with a packet outbound from the network node, validating an IP header checksum associated with a packet inbound from the network node, locating the next network node in the path to a destination IP address, fragmenting a packet outbound from the network node, assembling inbound fragments, and obtaining a value of a maximum transmission unit parameter associated with a network path.

13. The network node of claim 1, wherein the I/O adapter is configured to handle interrupts associated with the TCP data path unit and the IP data path unit independently from the network host.

14. A method of configuring a network node to support a TCP/IP protocol stack, the TCP/IP protocol stack including a TCP layer and an IP layer, the TCP layer being configured to support at least one management function and at least one data path maintenance function, the IP layer being configured to support at least one management function and at least one data path maintenance function, the method comprising the steps of:

providing a network host configured to implement the management functions of the TCP and the IP layers;

providing an I/O adapter configured to implement the data path functions of the TCP and the IP layers, the I/O adapter coupled to communicate with the network host;

performing processing associated with the TCP and IP management functions on the network host independently of the I/O adapter; and performing processing associated with the TCP and IP data path functions on the I/O adapter independently of the network host.

15. The method of claim 14, further comprising the step of providing a plurality of I/O adapters coupled to the network host, each one of the I/O adapters implementing a separate data path.

16. The method of claim 14, wherein the step of performing processing associated with the TCP and IP management functions includes performing at least one of the following TCP management functions on the network host:

establishing a network connection, de-establishing a network connection, and defining an interface point between an application and the network.

17. The method of claim 14, wherein the step of performing processing associated with the TCP and IP management functions includes performing at least one of the following IP management functions on the network host:

implementing an address resolution protocol (ARP), implementing a reverse address resolution protocol (RARP), and performing subnet addressing.

18. The method of claim 14, wherein the step of performing processing associated with the TCP and IP data path functions includes performing at least one of the following TCP data path functions on the network adapter:

parsing an inbound TCP header, building an outbound TCP header, finding a connection via inbound IP version 4 (IPv4) and TCP headers, obtaining a value of a maximum transmission unit parameter associated with a network path, performing TCP sliding window management, acknowledging outbound data from a remote node, acknowledging inbound data to the remote node, and reassembling out-of-order inbound data.

19. The method of claim 14, wherein the step of performing processing associated with the TCP and IP data path functions includes performing on the I/O adapter at least one of:

parsing an inbound IP version 4 (IPv4) header, building an outbound IPv4 header, generating an IP header checksum associated with a packet outbound from the network node, validating an IP header checksum associated with a packet inbound to the network node, locating a further network node adjacent the network node, fragmenting a packet outbound from the network node, assembling inbound fragments, and obtaining a value of a maximum transmission unit parameter associated with a network path.

20. The method of claim 14, wherein step of performing processing associated with the TCP and IP data path functions includes handling interrupts associated with the TCP data path unit and the IP data path unit on the I/O adapter independently from the network host.

* * * * *